United States Patent
Seo et al.

(10) Patent No.: US 7,346,165 B2
(45) Date of Patent: Mar. 18, 2008

(54) APPARATUS AND METHOD FOR GENERATING SCRAMBLING CODE IN MOBILE COMMUNICATION SYSTEM

(75) Inventors: Kyung Sam Seo, Anyang-si (KR); Dong Jo Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 688 days.

(21) Appl. No.: 10/154,798

(22) Filed: May 28, 2002

(65) Prior Publication Data

US 2002/0181708 A1 Dec. 5, 2002

(30) Foreign Application Priority Data

May 29, 2001 (KR) .................. 2001-29712

(51) Int. Cl.
*H04K 1/02* (2006.01)
(52) U.S. Cl. .................. 380/252; 380/42; 380/255
(58) Field of Classification Search .................. 380/42, 380/252, 255
See application file for complete search history.

(56) References Cited

U.S. PATENT DOCUMENTS

| | | | | |
|---|---|---|---|---|
| 3,988,538 | A * | 10/1976 | Patten | 380/268 |
| 4,052,565 | A * | 10/1977 | Baxter et al. | 380/28 |
| 4,295,223 | A * | 10/1981 | Shutterly | 455/72 |
| 4,383,322 | A * | 5/1983 | Halpern et al. | 375/141 |
| 4,434,322 | A * | 2/1984 | Ferrell | 380/43 |
| 4,639,777 | A * | 1/1987 | Mori | 380/223 |
| 4,771,455 | A * | 9/1988 | Hareyama et al. | 380/276 |
| 5,103,459 | A * | 4/1992 | Gilhousen et al. | 370/206 |
| 5,191,609 | A * | 3/1993 | Mun | 380/214 |
| 5,241,602 | A * | 8/1993 | Lee et al. | 380/268 |
| 5,272,753 | A * | 12/1993 | Nakayama et al. | 380/228 |
| 5,283,831 | A * | 2/1994 | Cook et al. | 380/268 |
| 5,295,153 | A * | 3/1994 | Gudmundson | 370/335 |
| 5,309,474 | A * | 5/1994 | Gilhousen et al. | 370/209 |
| 5,341,397 | A * | 8/1994 | Gudmundson | 370/335 |
| 5,351,300 | A * | 9/1994 | Quisquater et al. | 380/46 |
| 5,355,415 | A * | 10/1994 | Lee et al. | 380/47 |
| 5,357,454 | A * | 10/1994 | Dent | 708/410 |
| 5,392,354 | A * | 2/1995 | Takahashi et al. | 380/270 |
| 5,414,728 | A * | 5/1995 | Zehavi | 375/142 |
| 5,416,797 | A * | 5/1995 | Gilhousen et al. | 370/209 |
| 5,497,395 | A * | 3/1996 | Jou | 370/209 |
| 5,532,695 | A * | 7/1996 | Park et al. | 341/173 |
| 5,568,553 | A * | 10/1996 | Takahashi et al. | 380/270 |
| 5,619,526 | A * | 4/1997 | Kim et al. | 370/335 |
| 5,631,922 | A * | 5/1997 | Sekine et al. | 375/140 |
| 5,706,346 | A * | 1/1998 | Katta et al. | 380/217 |

(Continued)

*Primary Examiner*—Nasser Moazzami
*Assistant Examiner*—David Garcia Cervetti
(74) *Attorney, Agent, or Firm*—Ked & Associates, LLP

(57) ABSTRACT

An apparatus generates a scrambling code in a mobile communication system by performing one or more mask operations on an input state value. The apparatus includes a register memory which receives the state value from an upper layer of the system, a generator which generates an extended state value by performing a mask operation based on initial values of the state value, and a code generator which generates a scrambling code based on at least a first state value which is continuously selected from among the extended state value, a second state value generated based on at least state values (L,R) which correspond to the first state value, and an initial value which has not been used from the initial values.

20 Claims, 5 Drawing Sheets

U.S. PATENT DOCUMENTS

| | | | | |
|---|---|---|---|---|
| 5,715,236 | A | * | 2/1998 | Gilhousen et al. .......... 370/209 |
| 5,790,487 | A | * | 8/1998 | Moriya et al. ........... 369/47.23 |
| 5,825,888 | A | * | 10/1998 | Kimura et al. ............. 380/270 |
| 5,835,488 | A | * | 11/1998 | Sugita ....................... 370/335 |
| 5,850,379 | A | * | 12/1998 | Moriya et al. ........... 369/59.26 |
| 5,883,889 | A | * | 3/1999 | Faruque ..................... 370/335 |
| 5,887,252 | A | * | 3/1999 | Noneman ................... 455/463 |
| 5,917,852 | A | * | 6/1999 | Butterfield et al. ........ 375/141 |
| 5,926,070 | A | * | 7/1999 | Barron et al. ................. 331/78 |
| 5,966,447 | A | * | 10/1999 | Nishida et al. .............. 380/28 |
| 5,970,084 | A | * | 10/1999 | Honda ....................... 375/147 |
| 5,991,308 | A | * | 11/1999 | Fuhrmann et al. ..... 370/395.53 |
| 5,991,416 | A | * | 11/1999 | Bae ............................. 380/39 |
| 6,038,250 | A | * | 3/2000 | Shou et al. ................. 375/143 |
| 6,101,194 | A | * | 8/2000 | Annapareddy et al. ..... 370/447 |
| 6,108,369 | A | * | 8/2000 | Ovesjo et al. .............. 375/146 |
| 6,158,026 | A | * | 12/2000 | Kawahara .................. 714/701 |
| 6,173,006 | B1 | * | 1/2001 | Kent et al. ................. 375/145 |
| 6,185,246 | B1 | * | 2/2001 | Gilhousen .................. 375/130 |
| 6,201,870 | B1 | * | 3/2001 | Medard et al. .............. 380/46 |
| 6,222,828 | B1 | * | 4/2001 | Ohlson et al. .............. 370/320 |
| 6,226,315 | B1 | * | 5/2001 | Sriram et al. ............... 375/140 |
| 6,266,331 | B1 | * | 7/2001 | Baker et al. ................ 370/335 |
| 6,272,168 | B1 | * | 8/2001 | Lomp et al. ................ 375/222 |
| 6,275,558 | B1 | * | 8/2001 | Ichihara ....................... 377/64 |
| 6,317,422 | B1 | * | 11/2001 | Khaleghi et al. ........... 370/342 |
| 6,324,205 | B1 | * | 11/2001 | Prasad ....................... 375/130 |
| 6,385,180 | B1 | * | 5/2002 | Maru ......................... 370/335 |
| 6,389,138 | B1 | * | 5/2002 | Li et al. ....................... 380/35 |
| 6,445,714 | B1 | * | 9/2002 | d'Anjou et al. ............. 370/441 |
| 6,459,694 | B1 | * | 10/2002 | Sari et al. ................... 370/342 |
| 6,483,828 | B1 | * | 11/2002 | Balachandran et al. ..... 370/342 |
| 6,512,753 | B1 | * | 1/2003 | Kim et al. .................. 370/335 |
| 6,519,238 | B1 | * | 2/2003 | Miya et al. ................. 370/335 |
| 6,542,478 | B1 | * | 4/2003 | Park ........................... 370/308 |
| 6,597,911 | B1 | * | 7/2003 | Kransmo .................... 455/436 |
| 6,603,735 | B1 | * | 8/2003 | Park et al. .................. 370/208 |
| 6,631,158 | B2 | * | 10/2003 | Lipponen et al. ........... 375/150 |
| 6,643,280 | B1 | * | 11/2003 | Li et al. ..................... 370/342 |
| 6,665,692 | B1 | * | 12/2003 | Nieminen ................... 708/250 |
| 6,680,978 | B1 | * | 1/2004 | Schneider et al. .......... 375/242 |
| 6,717,977 | B1 | * | 4/2004 | Lee ............................ 375/147 |
| 6,724,778 | B1 | * | 4/2004 | Laird et al. ................. 370/342 |
| 6,735,606 | B2 | * | 5/2004 | Terasawa et al. ........... 708/252 |
| 6,754,473 | B1 | * | 6/2004 | Choi et al. .................. 455/101 |
| 6,766,337 | B1 | * | 7/2004 | Bae et al. .................... 708/250 |
| 6,768,903 | B2 | * | 7/2004 | Fauconnier et al. ........ 455/403 |
| 6,788,728 | B1 | * | 9/2004 | Prasad et al. ............... 375/130 |
| 6,816,876 | B2 | * | 11/2004 | Jha et al. .................... 708/252 |
| 6,826,111 | B2 | * | 11/2004 | Schneider et al. ..... 365/230.06 |
| 6,829,289 | B1 | * | 12/2004 | Gossett et al. .............. 375/141 |
| 6,862,314 | B1 | * | 3/2005 | Jurgensen et al. .......... 375/142 |
| 6,885,691 | B1 | * | 4/2005 | Lyu ............................ 375/130 |
| 6,891,817 | B2 | * | 5/2005 | Miya et al. ................. 370/335 |
| 6,909,887 | B2 | * | 6/2005 | Fauconnier et al. ........ 455/403 |
| 6,917,641 | B2 | * | 7/2005 | Kotzin et al. ............... 375/130 |
| 6,928,066 | B2 | * | 8/2005 | Moon et al. ................ 370/342 |
| 6,950,456 | B2 | * | 9/2005 | Lee et al. .................... 375/146 |
| 6,956,948 | B1 | * | 10/2005 | Hwang et al. ................ 380/46 |
| 6,958,712 | B1 | * | 10/2005 | Subramoniam ............... 341/50 |
| 6,963,600 | B1 | * | 11/2005 | Fan et al. .................... 375/141 |
| 2002/0013797 | A1 | * | 1/2002 | Jha et al. .................... 708/250 |
| 2002/0013926 | A1 | * | 1/2002 | Kim et al. .................. 714/781 |
| 2002/0031167 | A1 | * | 3/2002 | Hamamoto ................. 375/130 |
| 2002/0031169 | A1 | * | 3/2002 | Lipponen et al. ........... 375/130 |
| 2002/0138721 | A1 | * | 9/2002 | Kwon et al. ................ 713/151 |
| 2002/0150058 | A1 | * | 10/2002 | Kim et al. .................. 370/280 |
| 2002/0174152 | A1 | * | 11/2002 | Terasawa et al. ........... 708/250 |

* cited by examiner

APPARATUS AND METHOD FOR GENERATING SCRAMBLING CODE IN MOBILE COMMUNICATION SYSTEM

BACKGROUND OF THE INVENTION

1. Field of the Invention

The present invention relates generally to processing signals in a mobile communication system, and more particularly, to an apparatus and method which generates scrambling codes for transmitting wireless signals.

2. Background of the Related Art

A mobile communication system performing code division generally uses a scrambling pseudo noise (PN) code to separate or identify each base station. In a standard specification of a Universal Mobile Telecommunications System (UMTS) W-CDMA (Wideband Code Division Multiple Access) which is a system for performing European wireless communications, multiple scrambling codes are generated by separating a plurality of scrambling codes into groups with a fixed length.

These scrambling codes provide the dual benefit of increasing capacity and identifying each base station in the UMTS mobile communication system. In performing the identification function, users are identified through a channel separation scheme which uses an orthogonal code for each group of plural scrambling codes. That is, the user bits, which are transported through a physical channel, are multiplied by a single scrambling code to identify cells or base stations, and by a channelization code to identify each subscriber in a next generation mobile communication system. The scrambling codes of a specific base station thus distinguish base stations in a next generation mobile communication system. Also, to cope with system insufficiencies caused by increasing numbers of users, multiple scrambling codes have been used. Consequently each base station must modulate a user signal with various scrambling codes in order to transmit in the next-generation mobile communication system.

A scrambling code which is used for transmitting information of the base station through, for example, a common pilot channel and common control channel is known as a primary scrambling code. Other codes which differ from the primary code are known as secondary codes. If M secondary codes are used in each base station, then a total of N*(M+1) scrambling codes are required in the field. Here, N means a total of Normal (primary and secondary) and Left/Right which means delayed values with respect to the Normal.

Presently, a range of delay values (n) from 0 to 24575 can be used in a system conforming to the 3GPP (3rd Generation Partnership Project) standard. This gives a total of 24576.

In the case that the "Normal" (the primary+the secondary) is ranged from 0 to 8191, the delay value of Left alternative is ranged from 8192 to 16383, and that of Right alternative is ranged from 16384 to 24575. That is, the delay state means that a generation of code can be started at the specific state regardless of order. Hereinafter a related art in the connection with this field will be described.

FIG. 1 shows a PN sequence generator of a related scrambling code generator. The PN code is a code used for separating base stations from each other relative to a mobile station. A PN sequence x(n) has a polynomial equation of $1+x^7+x^{18}$, and an X sequence register (PN sequence x(n)) of a PN sequence is a kind of shift register in the PN sequence generator as shown in FIG. 1.

$$x(0)=1, x(1)=x(2)=, , , =x(16)=x(17)=0 \quad (1)$$

$$x(i+18)=x(i+7)+x(i) \text{modulo} 2 \quad (2)$$

$$1+x^5+x^7 \quad (3)$$

An initial value for X sequence register of the PN sequence generator is given by equation(1), and the PN sequence x(n) is generated by equation(2) as values of the X sequence register is shifted. The PN sequence y(n) is generated by equation (3). If a period of the PN sequence generator is 24576 chips, the value of the sequence value exists from x(0) to x(24575).

A related method for generating a sequence will now be described with reference to the PN sequence generator shown in FIG. 1. In this method, an X generator and Y generator receive state values of scrambling code from an upper layer and set initial values thereof. An MX and an MY receive arbitrary state values of the X generator and the Y generator and perform EXOR(EXclusive OR) operation and input the result as a MSB (Most Significant Bit) of the X generator and the Y generator respectively. An MXI/MXQ and an MYI/MYQ perform a masking operation on x(n) and y(n) respectively. The MXI/MXQ and the MYI/MYQ performed by EXOR (EXclusive OR) operation are then output as an I code and a Q code, respectively.

The X sequence register of the PN sequence generator stores bit values 0, 0, 0, 0, 0, 0, 0, 0, 0, 0, 0, 0, 0, 0, 0, 0, 0, 1 from the left direction to the right direction in accordance with equation (1). Since "1" in address 0 of the X sequence register is shifted to the right direction and output, the first sequence value x(0) becomes 1, and since "0" in the address 1 is shifted to the right direction, x(1) becomes 0. x(0) to x(17) of the PN sequence are output the same as an initial set of equation (1), and x(18) to x(24575) of PN sequence could be expressed by equation (2). The operation is as follows.

After bit information of address 0 is output during the initial shift operation, bits from address 17 to address 1 of the register are shifted right by one bit. That is, the operation is performed in the manner that "0" originally stored in the address 1 is shifted to address 0, "0" originally stored in the address 2 is shifted to vacant address 0, as like. Finally, MSB "0" stored in the address 17 is shifted to address 16.

As a result of the shift operation, address 17 of the register becomes vacant, and then the result of the Exclusive OR (hereinafter it is called as EXOR) operation between MSB "0" in address 0 and "0" in the address 7 is inserted to the address 17. The value inserted into address 17 becomes x(18) value, i.e., a 19th value, of the PN sequence. Values up to x(24575) can be obtained by driving the PN sequence generator in the same manner.

When a mobile terminal is connected to a base station, the mobile terminal generates a forward PN sequence which is used in the base station to interpret the scrambling code transmitted from the base station. But, since the period of the PN sequence is apparently long, an amount of computations for generating the forward PN sequence from the initial value of the sequence is much too huge, thereby generating the sequence in a delayed state as needed.

To generate a PN sequence with a delay state, a method has been used for performing the mask operation in the field. If x(n) is a normal PN sequence without any delay in the PN sequence generator in FIG. 1, PN sequence output with delay of 24576 (for example) than x(n) is x(n+24576). In the case of the delay, a mask to be used (i.e., an EXOR operation performed with a mask covered over addresses 4, 5, and 15 of the register) is the one corresponding to that delay, and if there is a need for generating other delay, another shape of mask is used.

In the PN sequence, y(n) has a polynomial equation of $1+y^5+y^7$ and a Y sequence register of the PN sequence is a shift register. Operation of the Y sequence register is performed in the same manner as the operation of the X sequence register. Accordingly, scrambling code I is generated by performing an EXOR operation between masked code MXI and MYI, and scrambling code Q is generated by performing an EXOR operation between masked code MXQ and MYQ, as shown in FIG. 1

FIG. 2 shows a detailed configuration of a scrambling code generator shown in FIG. 1. The scrambling code generator includes an initial register value setting unit 20 for receiving a state value of scrambling code from an upper layer and setting initial values of registers, and a code generator 21 for generating code based on the initial state. Since the basic operation of the related scrambling code generator is described with reference to FIG. 1, and omitted parts in the above description will be described hereinafter.

In the generator of FIG. 2, an initial code value (INI_X [17:0]) of 32 bits of scrambling code is input into an X register from the upper layer, and a "1" value is input to all addresses of the Y sequence register. In terms of signals, "CLOCK_N_TIMES" is a value of chip x N and the N can be one of 2, 4, and 8, "INT" is a signal to initialize the system, and "EN_NEXT" is a signal for advancing from a current state to a next state, that is, EN_NEXT notifies an advance to the next state after the initialization. MX and MY are units which perform the mask operation over a concerned state values of the X and the Y sequence registers.

MXI, MXQ, MYI, and MYQ are units which to mask the code output from the initial register value setting unit 20 and output the codes of SCXI, SCYI, SCXQ and SCYQ respectively, thereby generating a desired scrambling code through the EXOR operation.

The related system and method described above has a number of drawbacks. Specifically, when the mobile terminal is connected to the base station, the forward PN sequence has to be generated in the related scrambling code generator as described above. Since the period of the PN sequence is apparently long, an amount of operation for generating forward PN sequence from the initial value of the sequence is huge, and therefore there is a need for generating a sequence in a delayed state as needed. At present, the range of delayed value(n) that can be used in the base station is a total of 24576(from 0 to 24574) in the standard specification of 3GPP. Accordingly, since the related PN sequence generator shown in FIG. 2 generates codes by storing initial states of values of the X sequence register (18 bits*24576), a memory with a huge capacity is required. Also one scrambling code I and Q can be generated in response to a clock in the related scrambling code generator.

SUMMARY OF THE INVENTION

An object of the invention is to solve at least the above problems and/or disadvantages and to provide at least the advantages described hereinafter.

Accordingly, it is an object of the present invention to provide an apparatus and method for generating scrambling code in a mobile communication system, which apparatus and method simultaneously generates a primary code, a secondary code, and a delayed code in a base station by using a code generator, thereby reducing the capacity of a memory to store code values.

These and other objects of the invention are achieved by providing a scrambling code generating apparatus in a mobile communication system which includes a register memory for receiving a state value of scrambling code from an upper layer to set initial values thereof a generator for generating an extended state value by performing a mask operation based on the initial values and input information; and a scrambling code generator for generating a scrambling code based on at least a first state value (of a primary code or a secondary code) which is continuously selected among state values which include the extended state value, a second state value selected by generating at least a state values (L,R) corresponding to at least the first state value, and an initial value which has not been used from the initial values.

A method of generating a scrambling code in a mobile communication system includes receiving a state value of scrambling code from an upper layer and setting initial values of at least two registers among a plurality of registers; generating an extended state value by performing a mask operation based on one of the initial values and input information; generating a masked state value by the mask operation based on the initial values; generating a selected state value with a predetermined number of continued bits from the extended state value and a delayed state value thereof; selecting one or more among the selected state value and the delayed state value; and outputting one of state values resulted in the step (c) or step (e) through a gate.

According to the present invention, the size of memory can be reduced largely, and forward codes, for example primary code, secondary code, delayed value Right and Left alternative, can be generated simultaneously by using a code generator.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
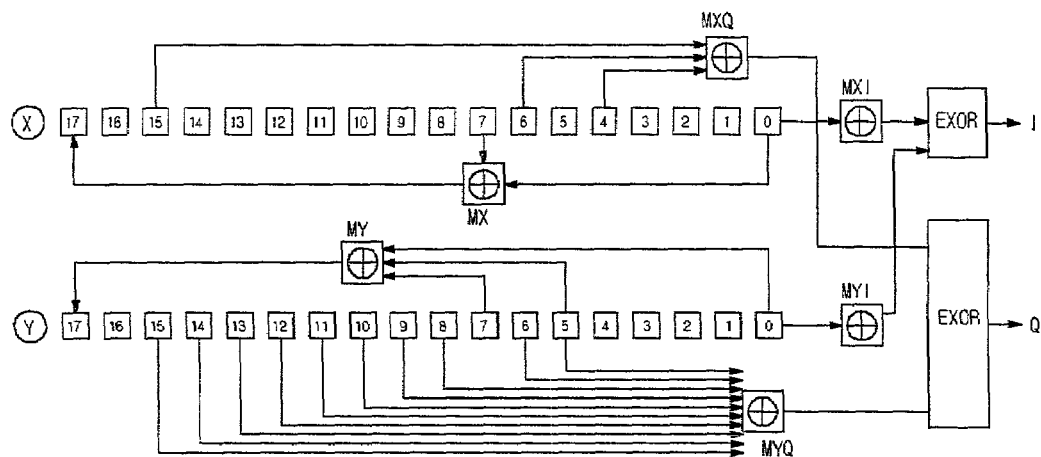
FIG. 1 shows a PN sequence generator of a related scrambling code generator.

The present invention will now be described with reference to the accompanying drawings. In the following description, same drawing reference numerals are used for the same elements even in different drawings. The embodiments in this description are provided to assist in a comprehensive understanding of the invention. It is apparent to those skilled in the art, however, that modifications to the present invention as described herein may be carried out without departing from the spirit and scope of the invention. Also, well-known functions or constructions are not described in detail since they would obscure the invention in unnecessary detail.

Figure 3:
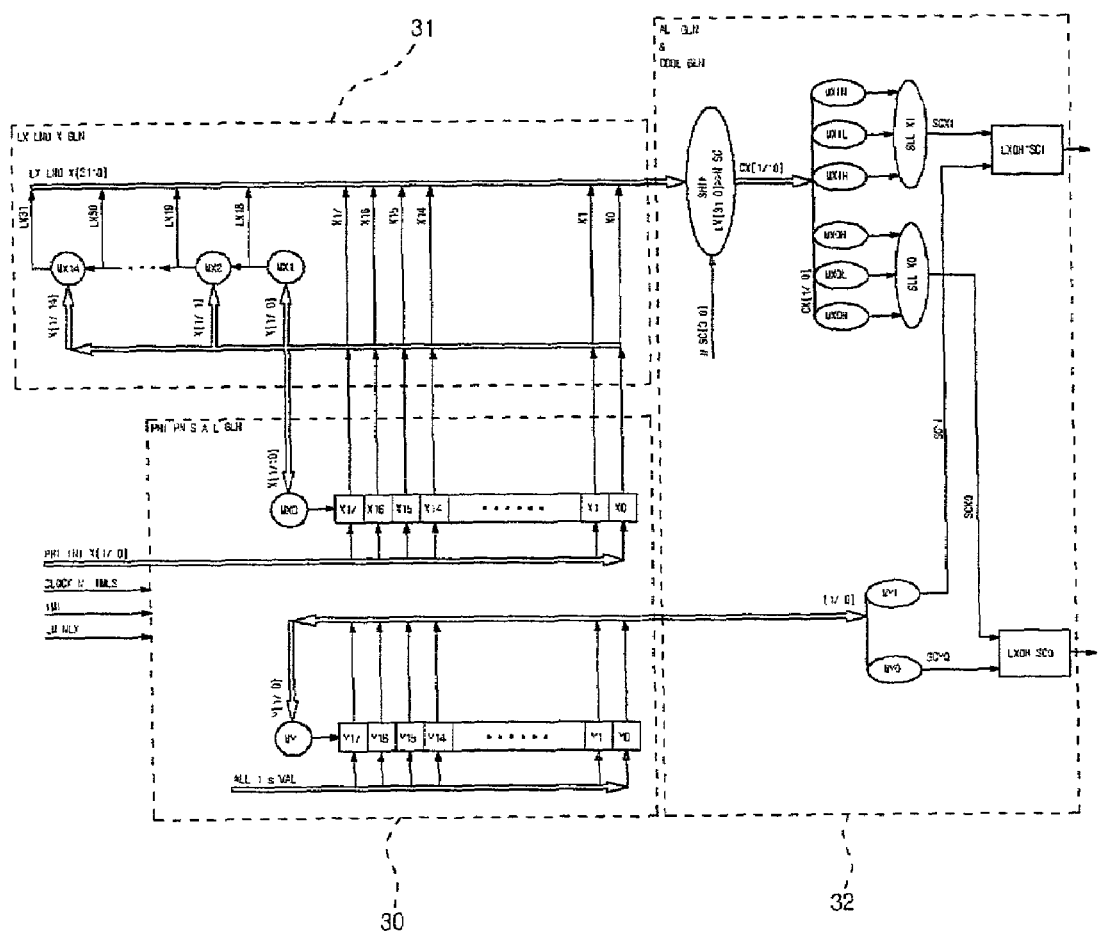
FIG. 3 shows a scrambling code generator according to the present invention.

FIG. 3 shows a scrambling code generator in a mobile communication system according to one embodiment of the present invention. The scrambling code generator includes a register memory 30 for receiving a state value of scrambling code from an upper layer and for setting initial values thereof, a generator 31 for generating an extended state value with a mask operation over initial values of an X sequence register and input information, and a scrambling code generator 32 for generating a scrambling code by using at least a first state value (of a primary code or a secondary code) which is continuously selected among state values which include the extended state value, a second state value selected by generating at least state values (L,R) corresponding to at least the first state value, and an initial value which has not been used from the initial values.

Figure 2:
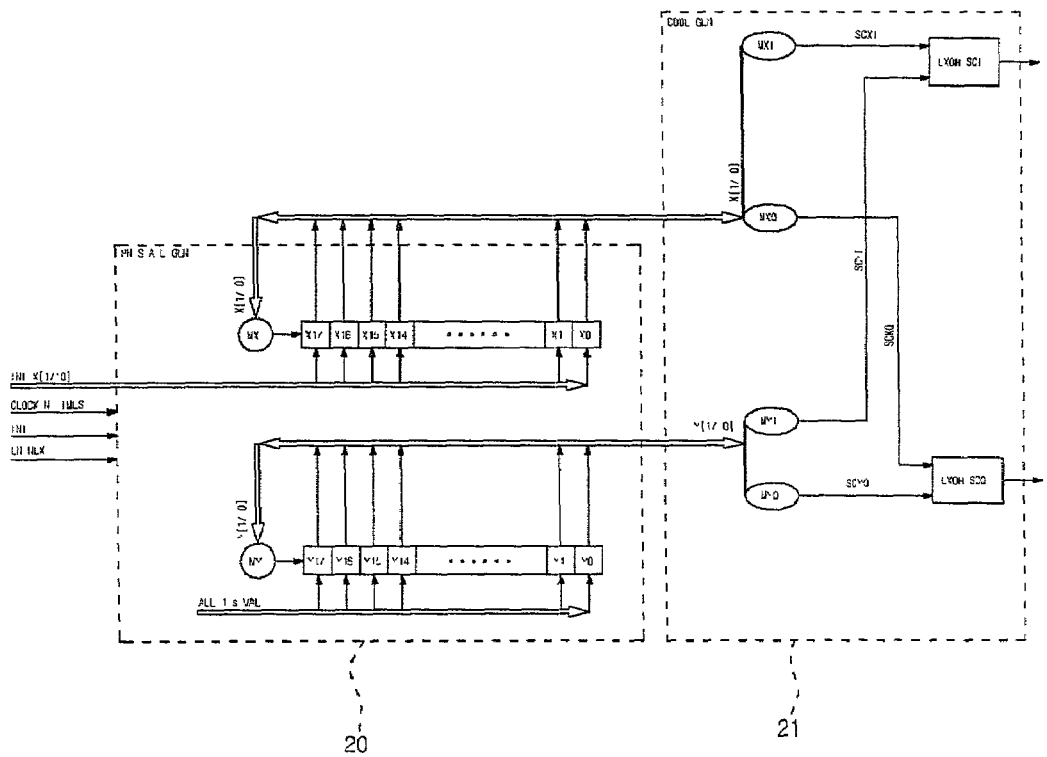
FIG. 2 shows detailed configuration of a scrambling code generator as shown in FIG. 1.

In this configuration, the register memory 30 corresponds to an initial register value setting unit 20 for receiving a state value of a scrambling code from the upper layer as shown in FIG. 2, and the basic operation thereof is the same as that of the initial register value setting unit 20. However, register memory 30 is different in that it stores initial values (PRI_INI_X[17:0]) of 18 bits primary scrambling code received from the upper layer into the X sequence register.

Figure 4:
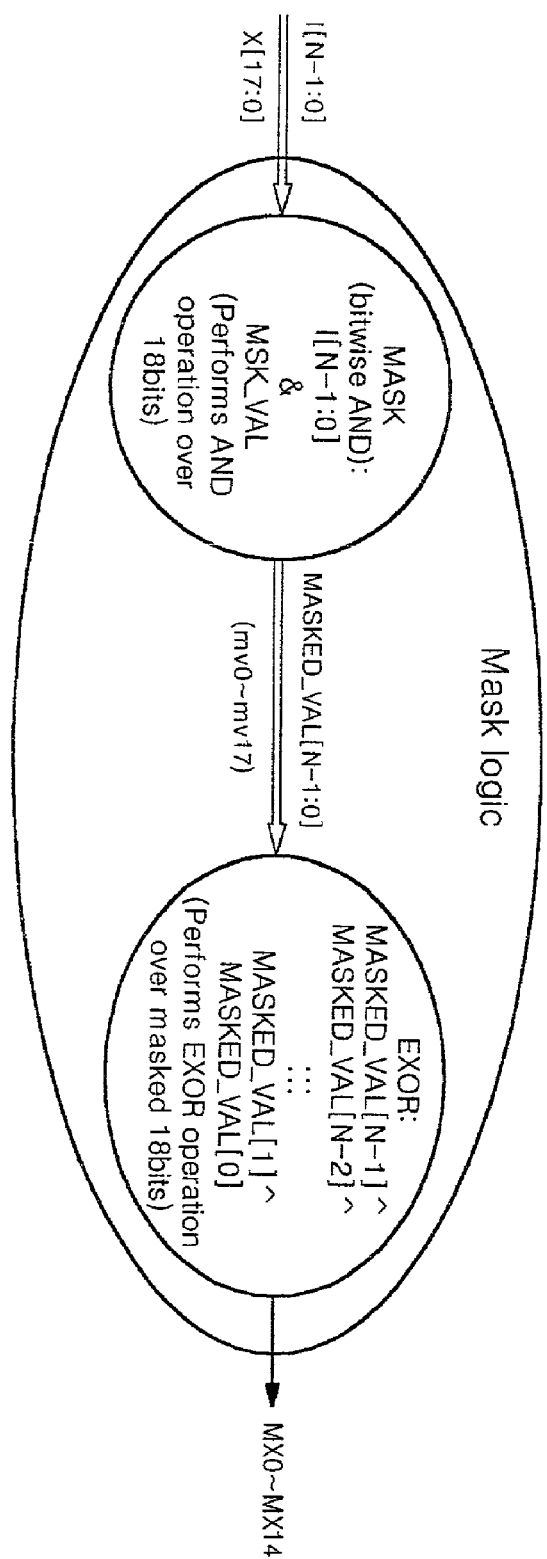
FIG. 4 shows a structure of mask of forward scrambling code generator according to the present invention.

FIG. 4 shows a structure of a mask of forward scrambling code generator 31 as shown in FIG. 3. FIG. 4 also shows an embodiment which generates a desired scrambling code in the scrambling code generator 31 which performs the mask operation over arbitrary sequential 18 bits to generate an extended state value.

Figure 5:
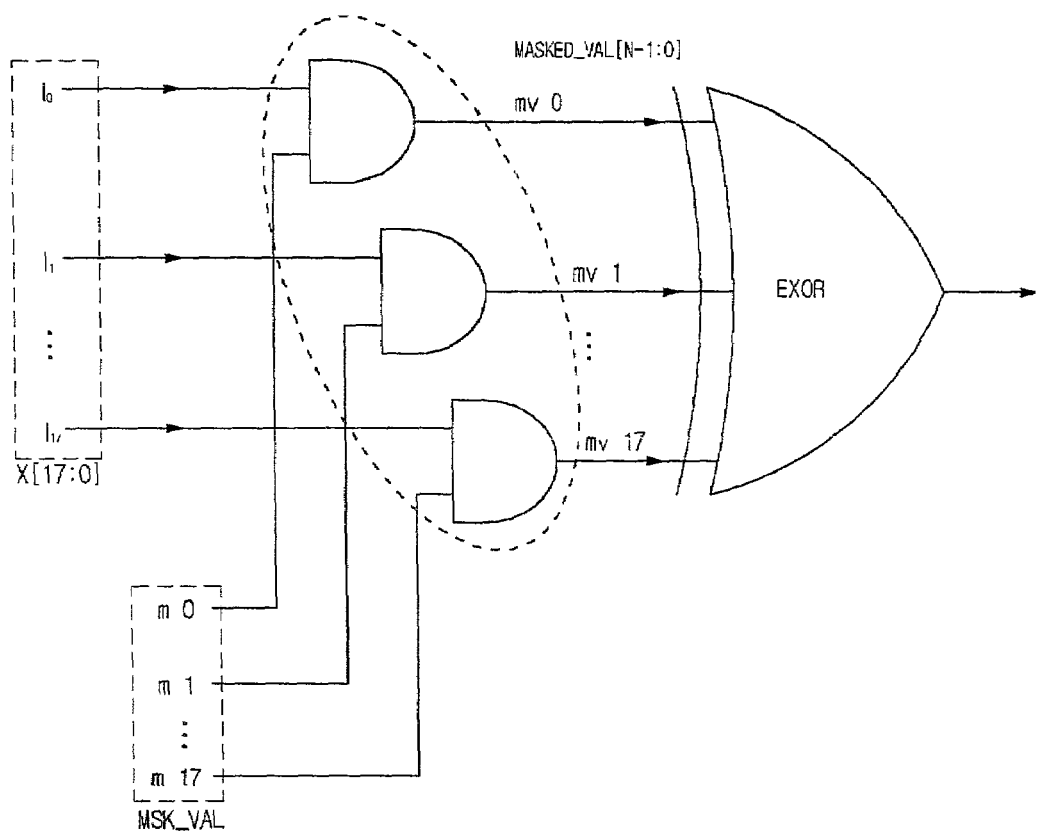
FIG. 5 shows a detailed process of operation in each mask as shown in FIG. 4.

FIG. 5 shows a preferred manner in which the masks of FIG. 4 operate. As shown, an AND operation is performed over 18 bit (I[N-1:0]) (X[17:0])($I_0 \sim I_{17}$) which is given to an MX0 as shown in FIG. 3 and each mask value (m0~m17) which is given from a controller (not shown) to achieve desired output. An EXOR operation is performed over a masked value (MASKED_VAL[N-1:0](mv0~mv17) to output the result thereof as an input of next MASK(MX1) to generate the desired scrambling code.

A method of generating scrambling code according to an embodiment of the present invention will now be described. As shown, the register memory 30, in which initial values are set, receives state value of 18-bit primary scrambling code and sets initial values of an X-sequence register and initial values of a Y-sequence register among a plurality of registers. The mask operation is then performed as described in FIGS. 1 and 2.

At a next clock, a masked value resulting from the mask operation with the initial values of the X sequence register are input to the extended state value generator 31 of FIG. 3 to generate an extended X value of 32 bits. That is, the extended X value (EXTEND X[31:0] in which 14 bits are added to the original 18 bits is separately generated. The 18-bits and 14-bits are variable depending on devices being used.

The mask operation is performed by continuously shifting the 18-bits of the X values of the 32-bits, while the method for extracting 18-bits can be arranged for at least 16 cases (N_SC[3:0], i.e., 16 (4-bits $2^4$), since the result of subtraction between 32-bits and 14-bits. Here N_SC (Number of Scrambling code) notifies 0-14 when bits of 0-17 (primary code), bits of 1-18, bits of 2-19 , , , or bits of 14-31 (secondary code) is selected by a shift selector, respectively. The shift selector selects one of the state values output from the extended code generator 31 as like bits of 0-17 (primary code), bits of 1-18, bits of 2-19 , , , bits of 14-31 (secondary code) orderly in the moving state.

Among the 16 methods to extract 18-bits from 32-bits, in the case of the first one that selects 18-bits from bit 0 (zero) continuously, primary scrambling code of 0-17 bits is generated. In the case of the others that selects 18-bits from bit 1, 2, 3, 4 . . . , or 14, a secondary scrambling code of bits of 1-18 bits, bits of 2-19 , , , or bits of 14-31 is generated. Therefore, the 18 bits, which are extracted continuously, of bits 0-31 from the extended code generator 31 shown in FIG. 3 are output by the selection of the shift selector (SHIFT EX[31:0]>>N_SC) which is controlled by a controller.

As previously described, 16 kinds of 18-bits could be input to MXIN of the scramble code generator 32 as shown in FIG. 3. For example, if 0 (zero) is selected by the movable selector, then 18-bits are input to the scramble code generator 32. At this time, MXIN becomes a code of Normal, MXIL becomes a code with delay of 8192 (Left alternative), and MXIR becomes a code with delay of 16384 (Right alternative). That is, the EXOR gate generates the desired scrambling code using at least selected I and Q values of N (Normal), L (Left) and R (Right), which is selected by the movable selector under control of the controller, masked I and Q value which is obtained by masking Y value.

As described above in the present invention, the initial values of the X sequence register is set by the initial values of the primary scrambling code of 18 bits received from the upper layer, and all addresses of the Y sequence register are set to 1. Thereafter, the next 32 states from X0 to EX31 are determined by the mask MX at the next clock, and 18 state values are selected continuously. The scrambling code is generated by the mask MX I/Q and MY I/Q. At this time, when one of the 18 state values (N,L,R) is selected using the selector (SEL_X1/XQ), one of scrambling codes with the delay among 0-8191 (Normal), 8192-16383 (Left alternative), and 16384-24575 (Right alternative) is generated.

Figure 6:
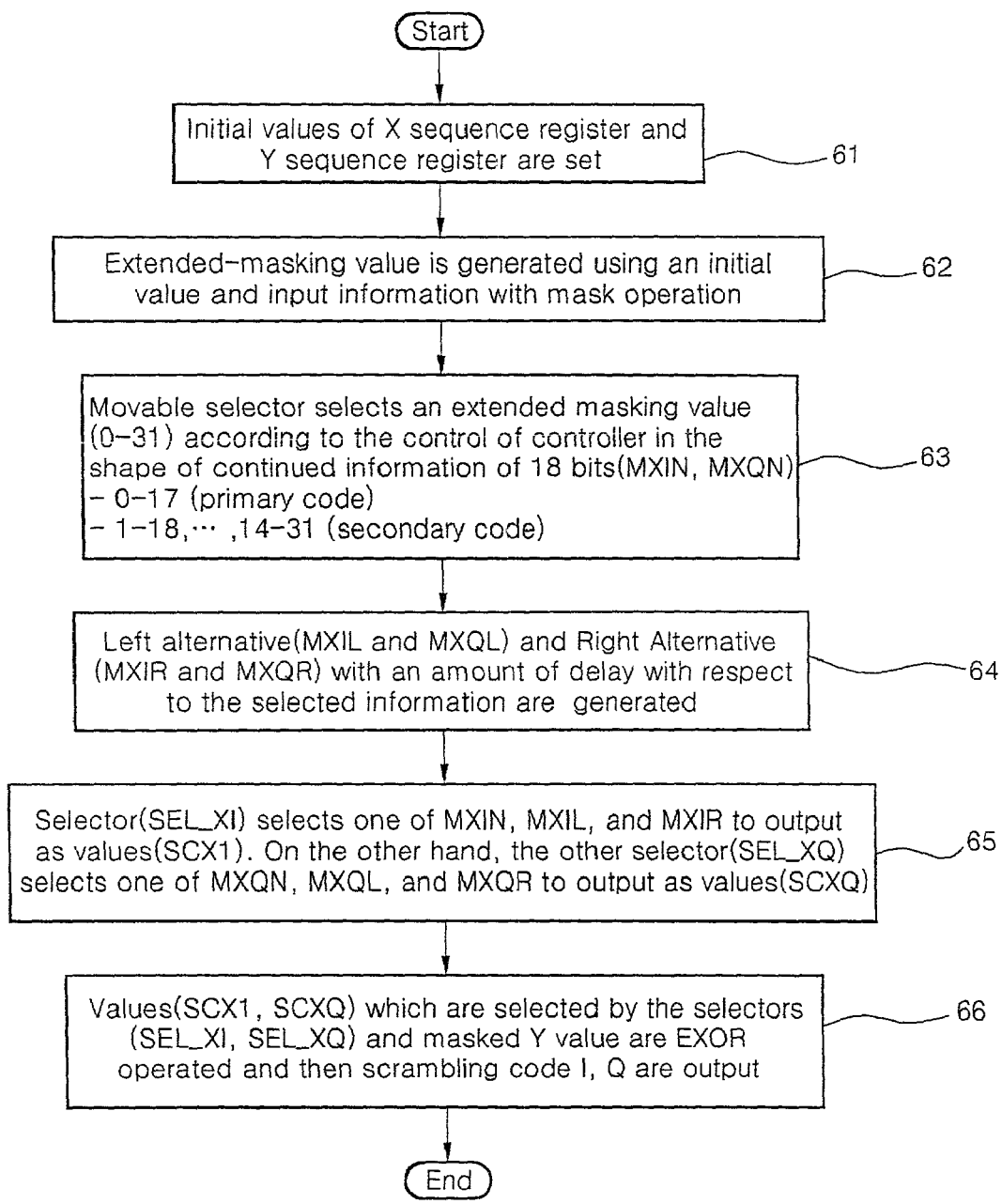
FIG. 6 a flow chard showing a method for generating scrambling code in a mobile communication system according to the present invention.

FIG. 6 is a flow chart showing a scrambling code generating method in a mobile communication system according to another embodiment of the present invention. First, initial values of the X-sequence register and the Y-sequence register are set (step 61). As previously described, the initial values 0,0,0,0,0,0,0,0,0,0,0,0,0,0,0,0,0,1 are input to the X-sequence register, and 1 is input to the all addresses of the Y-sequence register.

An extended masking value (X0-EX31) is generated using the initial values, an assigned value (m0, m1 , , , m17) by the controller, and input information (I[N-1:0])(X[17:0]) (step 62).

The movable selector (SHIFT EX[31:0]>>N_SC) selects the extended masking value (0-31) under control of the controller in a shape of continued information of 18-bits (MXIN, MXQN). When the bits are of 0-17 on the basis of LSB 0, the primary code is generated. And, when the 18-bits are selected continuously on the basis of 1 or more than, the secondary code is generated (step 63).

At this stage, the selected information (MXIN and MXQN) by the movable selector, Left alternative (MXIL and MXQL) and Right Alternative (NXIR and MXQR), with an amount of delay with respect to the selected information is generated. (step 64)

The selector (SEL_XI) selects one of the MXIN, MXIL, and MXIR as output values (SCX1). On the other hand, the other selector (SEL_XQ) selects one of the MXQN, MXQL, and MXQR as output values (SCXQ) (step 65).

Values (SCX1, SCXQ) which are selected by the selectors (SEL_XI, SEL_XQ) and a masked value (SCYI,SCYQ) obtained by masking the Y value are EXOR operated and then scrambling code I, Q is outputted (step 66).

As described above, the present invention relates to an apparatus and method for generating scrambling code, which apparatus and method perform a masking operation by selecting continued bits under control of the controller of the movable selector to obtain desired outputs from an extended code. The invention then generates a scrambling code by performing an EXOR operation with at least one code continuously masked as selected by the selector and another masked code.

The present invention therefore represents a significant improvement over conventional code generators. For example, the related PN sequence generator shown in FIG. 2 can generate only 0-17 code (primary code). The scrambling code generating apparatus according to the present invention, however, generates not only 0-17 code bits, but also code bits of 1-18, bits of 2-19, , , bits of 4-31 bits using a scrambling code generator 31 as shown in FIG. 3. The present invention therefore reduces memory capacity requirements up to 1/15 in comparison with that of the memory in the related art.

Further, only N state values can be generated in the desired PN sequence generator shown in FIG. 2. In contrast, the scrambling code generating apparatus according to the present invention generates not only the N state values but also the Left and the Right with an amount of delay with respect to the N state values. The present invention therefore further reduces memory capacity up to 1/3 to generate the desired scrambling code.

Still further, according to the present invention, since the primary code and the secondary code are generated continuously by selection of the movable selector (SHIFT EX[30:0]>>N_SC) in the single scrambling code generator, N and Left/Right with the amount of delay with respect to N may be generated simultaneously.

Still further, in order to store initial states generated by the value of the X sequence register (18 bits*24576, here 25576 is produced by (the number of primary codes+the number of secondary codes)*(N+R+L), huge capacities of memory must be used. In the present invention, the initial values of the X-sequence register (bits of 0~17) may be stored, and delayed values may be generated. Consequently, memory capacity may be reduced up to 1/45 (1/15*1/3).

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A scrambling code generating apparatus in a mobile communication system, the method comprising:

a register memory unit which receives a state value of a scrambling code from an upper layer to set initial values of a first and a second sequence register of the register memory unit a generator which generates an extended state value by adding masked bits to the initial value of the first sequence register, the masked bits generated by performing a mask operation based on the initial value of the first sequence register and input information, the extended state value having a number of bits greater than a number of bits of the initial value of the first sequence register; and a scrambling code generator comprising a movable selector which continuously selects a first selected value from the extended state value under control of a controller, the scrambling code generator generating the scrambling code based on at least the first selected value, and the initial value of the second sequence register.

2. An apparatus according to claim 1, wherein the input information includes one or more mask bits.

3. The apparatus according to claim 1, wherein the scrambling code generator further comprises a second selector which selects a second selected value from among the first selected value and two delayed values (L, R) of the first selected value, the two delayed values selected by the controller.

4. The apparatus according to claim 3, wherein I and Q values of the scrambling code are generated by performing an EXOR operation using the second selected value selected by the second selector and masked value of the initial value of the second sequence register.

5. An apparatus according to claim 1, wherein the scrambling code includes a short Pseudo Noise (PN) code to be used in a forward link between a mobile station and a base station.

6. An apparatus according to claim 1, wherein the scrambling code is used by a mobile stations in a forward link between the mobile station and at least one of the base stations.

7. An apparatus according to claim 1, wherein the scrambling code generator generates the scrambling code by simultaneous generating a primary code, a secondary code, and a delayed code.

8. The apparatus according to claim 7, wherein the scrambling code is used in a forward link between a mobile station and a base station.

9. A method of generating a scrambling code in a mobile communication system, the method comprising:

receiving a state value of scrambling code from an upper layer and setting initial values of a first and a second sequence register of a register memory unit;

generating an extended state value by adding masked bits to the initial value of the first sequence register, the masked bits generated by a mask operation based on the initial value of the first sequence register and input information;

generating a first selected state value with a predetermined number of bits and a delayed state value of the first selected state value, the first selected state value continuously selected from the extended state value; and selecting a second selected state value from among the first selected state value and the delayed state value in forming the scrambling code, wherein the extended state value has a number of bits greater than a number of bits of the initial value of the first sequence register.

10. A method of generating a scrambling code in a mobile communication system, the method comprising:

(a) receiving a state value of a scrambling code from an upper layer and setting initial values of a first and a second sequence register of a register memory unit;

(b) generating an extended state value by adding masked bits to the initial value of the first sequence register, the masked bits generated by a first mask operation based on the initial value of the first sequence register and input information, wherein the extended state value has a number of bits greater than a number of bits of the initial value of the first sequence register;

(c) generating a first selected state value with a predetermined number of continued bits from the extended state value and a delayed state value of the first selected state value;

(d) selecting a second masked state value by a second mask operation based on the initial value of the second sequence register;

(e) generating a second masked state value by a second mask operation based on the initial value of the second sequence register; and (f) generating the scrambling code based on the first masked state value and the second masked state value.

11. The method according to claim 10, wherein the first sequence register is an X sequence register, and wherein step (b) includes:

generating a masked X value by the first mask operation of masking the initial value of the X-sequence register with the input information, and generating the extended state value by adding the masked X value to the initial value of the X-sequence register.

12. The method according to claim 10, wherein the first sequence register is an X sequence register, and wherein step (b) generates the extended state value of the X-sequence register based on the initial value of the X sequence register and output information outputted by the first mask operation, a first bit of the output information generated by performing an AND operation using the initial value of the X sequence register and the input information, and by performing an EXOR operation using the AND operated information.

13. The method according to claim 12, wherein the first bit of the output is inputted into a generation operation for generating a second bit of the output information, to generate the extended state value of the X sequence register.

14. The method according to claim 13, wherein the a number of bits forwarded from one generation operation for generating one bit of the output information to another generation operation for generating another bit following the one bit of the output information is increased by 1 bit.

15. The method according to claim 10, wherein if the extended state value is continuously selected, a primary code is selected based on a Least Significant Bit (LSB) of the initial value stored in the first sequence register.

16. The method according to claim 15, wherein if the extended state value is continuously selected, a secondary code is selected based on a bit other than the Least Significant Bit (LSB).

17. The method according to claim 10, wherein an N value of a primary or secondary code is generated corresponding to continuously inputted values on condition that the extended state value is masked on a continuously selected value from the extended state value.

18. The method according to claim 17, wherein at least a value, having a delay for the N value corresponding to the continuously inputted values, is generated on condition that the extended state value is masked on the continuously selected value from the extended state value.

19. The method according to claim 18, wherein the scrambling code is generated by inputting to a gate scrambled I/Q values selected among the N value, an L value, an R value and I/Q values selected among the second masked state value wherein the L value and the R value are the values having a delay for the N value.

20. The method according to claim 19, wherein the scrambling code, outputted by masking when 18-bits are continuously inputted based on 0 of the LSB, has an amount of delay of 0 (Normal), 8192 (Left alternative) and 16384 (Right alternative), and is generated by performing an EXOR operation.

* * * * *